United States Patent [19]
Bonke et al.

[11] Patent Number: 4,918,651
[45] Date of Patent: Apr. 17, 1990

[54] METHOD AND DISK CONTROLLER ARCHITECTURE FOR ZERO LATENCY DATA READ

[75] Inventors: Carl Bonke, Rancho Santa Margarita; Aurelio Cruz, San Juan Capistrano, all of Calif.

[73] Assignee: Western Digital Corporation, Irvine, Calif.

[21] Appl. No.: 220,535

[22] Filed: Jul. 18, 1988

[51] Int. Cl.⁴ .............................................. G06F 13/00
[52] U.S. Cl. ................................. 364/900; 364/952.1; 364/947.2; 364/939.3
[58] Field of Search ... 364/200 MS File, 900 MS File; 360/48, 49

[56] References Cited

U.S. PATENT DOCUMENTS

| | | | |
|---|---|---|---|
| 3,848,235 | 11/1974 | Lewis et al. | 360/48 X |
| 4,241,420 | 12/1980 | Fish et al. | 364/900 |
| 4,258,418 | 3/1981 | Heath | 364/200 |
| 4,494,157 | 1/1985 | Ina et al. | 360/48 |

Primary Examiner—Thomas M. Heckler
Attorney, Agent, or Firm—Christie, Parker & Hale

[57] ABSTRACT

The invention provides a method and architecture for reading data from a track on a data disk with no latency in initiation of the data transfer due to sector alignment. Sector identification bytes are compared for track identification while sector number is written for storage in a table lookup with a buffer address for storage of the data.

2 Claims, 6 Drawing Sheets

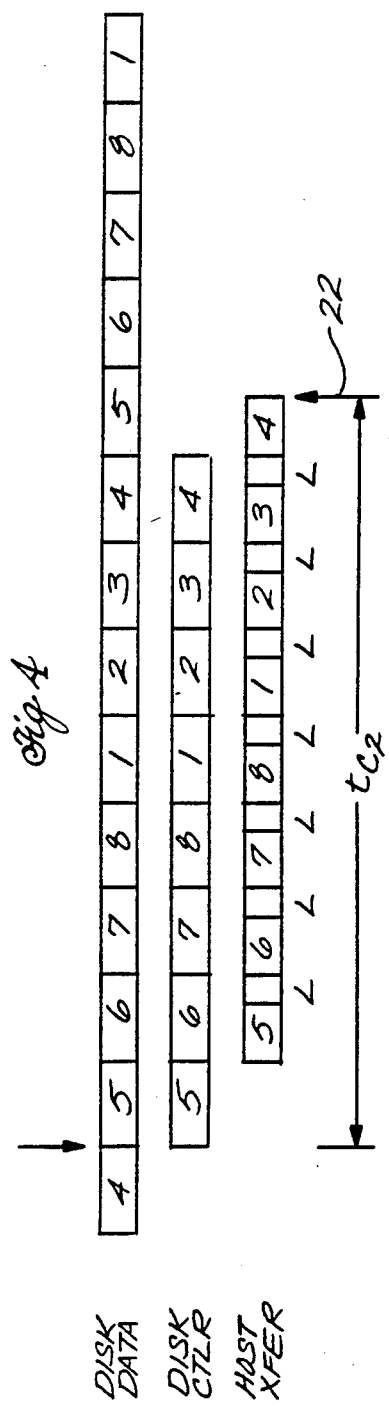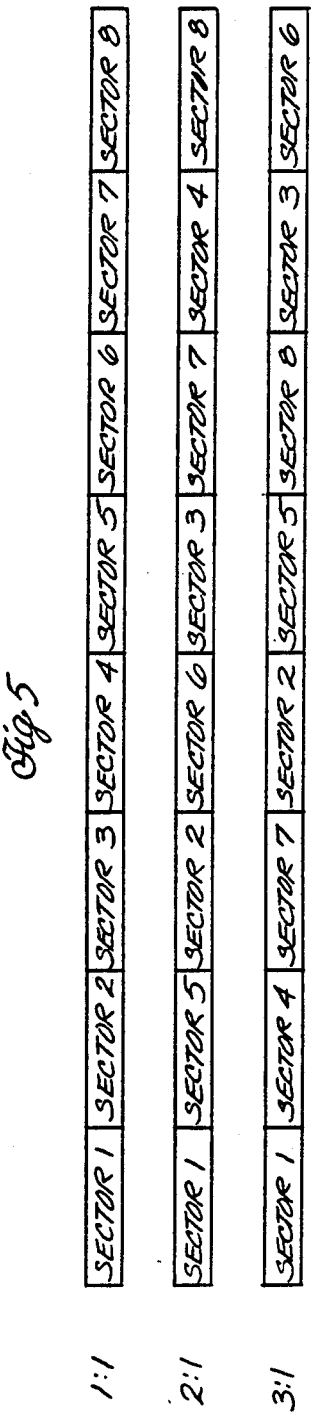

METHOD AND DISK CONTROLLER ARCHITECTURE FOR ZERO LATENCY DATA READ

This invention relates generally to disk controller architectures for transfer of data from the disk to a host computer. In particular, this invention provides a method and architecture for reading data from a track on the disk with no latency in initiation of the data transfer due to sector alignment.

BACKGROUND OF THE INVENTION

Data read from a disk drive is typically received serially by the peripheral controller. The data is synchronized and framed by the controller. A command from the host computer to read data will include information on the drive and head selected as well as cylinder and sector information, each sector of data stored on the disk contains identification information as well as data. The ID field contains cylinder head and sector bytes, individually identifying the sector.

When the ID field has been framed, the controller compares the cylinder byte of the sector being read with the cylinder byte of the commanded sector address. A positive comparison of the cylinder will result in comparison of the head byte with the commanded head information. A positive comparison of the head will then result in a comparison of the sector number byte until the proper sector is located. Once the sector byte read by the controller matches the commanded sector byte, the data field will be read from the disk for transfer to the host computer.

If the read operation is initiated when the head is located at a point on the track displaced from the commanded initial sector address, the data from the track is not read until the commanded initial sector is reached and a sector byte compare is obtained. This reduces the potential speed of data transfer from the disk.

In addition, where data sectors are interleaved on the disk track, reading of data sectors from the track is interrupted since each sector in sequence must be located and compared before data is read from the sector. As a consequence, several revolutions of the disk may be required to obtain a full track of data from the disk drive.

SUMMARY OF THE PRESENT INVENTION

The present invention provides a capture means for detecting and framing the bytes of the ID field present in the sectors on the disk. A plurality of registers contains the sector identification for the commanded data read. Four bytes are provided for identification including cylinder high, cylinder low, select drive and head (or SDH), and sector. These registers are collectively designated the task file. A comparator is connected between the capture means and the task file to compare ID bytes present in the capture means and in the task file. A positive compare signal output is provided. Means for transferring data from the capture means into the task file is provided to write bytes present in the capture means into a designated register of the task file under the control of a compare and read state machine. The state machine provides outputs commanding the read and write functions of each register of the task file and providing a transfer enable signal for the data transfer means.

A zero latency read is accomplished under the control of the state machine by reading and comparing cylinder high, cylinder low and SDH bytes from the capture means and the task file. Positive comparison of these three bytes will result in a transfer enable command from the state machine to the data transfer means and a sector register write command to the sector register of the task file, thereby writing the incoming sector number in the capture means into the task file sector register. Data is then read from the sector to the buffer memory and the microprocessor maps sector number with buffer address. Each sector from the entire track is read in this fashion until all sectors on the track have been completed. Data is then transferred to the host computer under control of the microprocessor in the desired sector order.

DESCRIPTION OF THE FIGURES

FIG. 4 is a representation of a data transfer between the disk controller and host computer using a zero latency read and non-sequential host transfer.

FIG. 5 is a representation of sector interleave for one-to-one, two-to-one, and three-to-one interleave with an eight-sector track.

DETAILED DESCRIPTION OF THE INVENTION

The present invention provides for significantly improved data transfer times between a disk and host computer by allowing immediate initiation of a data read by the controller upon reaching the commanded track without waiting for alignment of the initial sector defined in the read command. The invention is suitable for use with a microprocessor control peripheral controller and buffer memory similar to that defined in the copending U.S. patent application number 07/220,531 for a Data Recording System Buffer Management and Multiple Host Interface Control by Carl Bonke, et al., filed substantially concurrently with the present application and having the same assignee, the disclosure of which is incorporated herein by reference.

Figure 1:
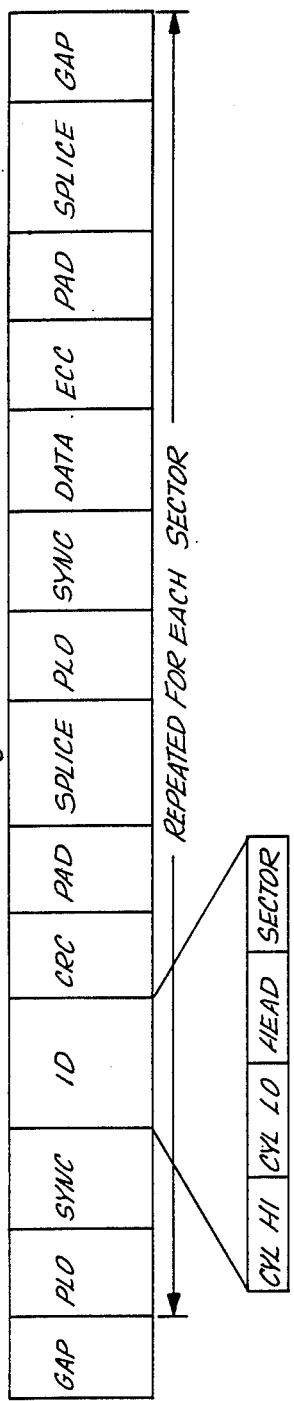
FIG. 1 is a representation of the data format for a sector of a disk track.

Referring now to the drawings, a standard disk data format employed by the invention is shown in FIG. 1. The PLO field is a frequency pattern used to lock a data separator phase lock loop to the data rate. The following SYNC field provides a second pattern to establish byte synchronization for data transfer. The ID field comprises four bytes of information, a first byte designating the most significant bit of the cylinder, the second byte designating the least significant bits of the cylinder, a third byte designating the head, and a fourth byte designating the sector. The combined cylinder head and sector ID of each data sector is unique. The cylinder and head bytes define a track on a platter in the disk drive. The CRC field provides cyclic recurring check sum data for error verification during data transfer. A PAD comprising a low frequency pattern separates the CRC field from the SPLICE field. The SPLICE is an interruption in readable data due to transient data on the media from write circuit turn-on and turn-off times. A second PLO and SYNC field are provided prior to the data field for relocking the data separator and data byte framing. The data field contains the information stored on the disk in the address sector. The ECC field provides for error correcting codes for error detection and correction. A second pad and splice field are provided, and a gap field to account for motor speed tolerance and to allow for intersector processing. In reading data from a disk, prior art disk controllers would initiate a data transfer starting at the sector requested in the command by the host computer.

Figure 2:
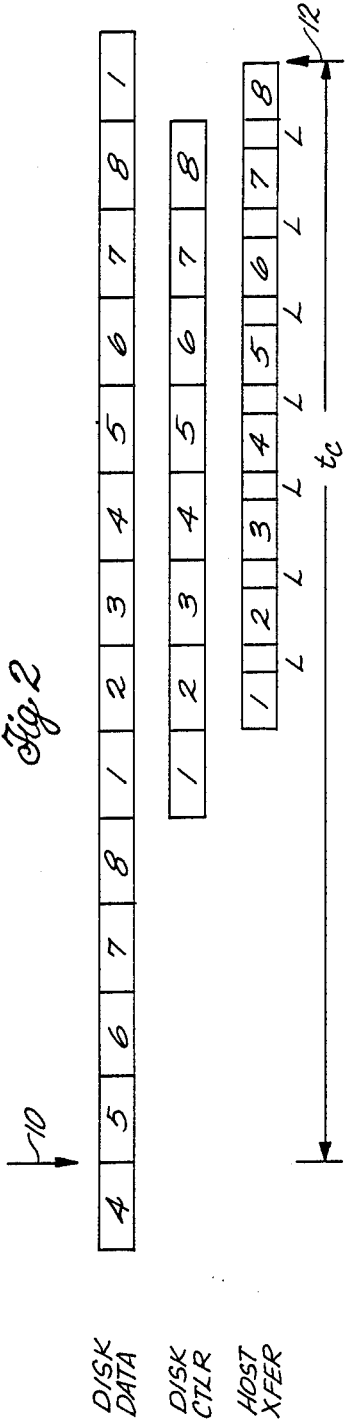
FIG. 2 is a representation of data transfer between the disk controller and host computer for a sequential read.

In the example shown in FIG. 2, the host computer has requested the transfer of one track comprising eight sectors of data, beginning with sector 1. The command is issued at the time indicated by the arrow 10. At that time, the head location on the disk data track is between sectors 4 and 5. The disk controller begins comparison of the sector ID information upon receiving the host command. A positive compare with the sector number does not occur until sector 1 is reached. Upon reaching sector 1, the disk controller transfers data from the disk to a buffer memory. Upon completion of the transfer of the entire sector of data, the disk controller initiates transfer of that data to the host. Assuming a one-to-one interleave, which will be discussed in greater detail later, the sector having address number 2 follows sector 1 on the disk track, and the disk controller initiates a transfer of sector 2, followed by sector 3, and so on. The host transfer times are shorter than the disk transfer times due to the higher data transfer rate of the computer. Consequently, a time lag L is present between transfer of data sectors from the disk controller to the host computer while waiting for completion of transfer from the data disk to the disk controller.

Figure 3:
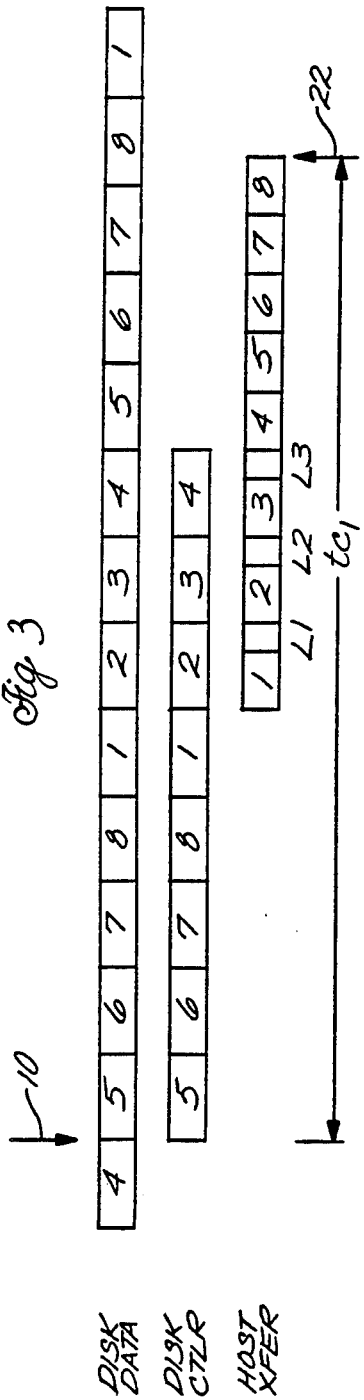
FIG. 3 is a representation of a data transfer between the disk, controller and host computer using a zero latency read with sequential host transfer.

A zero latency read provides an improvement of data transfer time, even where transfer to the host computer sequentially as requested is required. This can be seen by the example shown in FIG. 3. The read command is received from the computer at the time represented by the arrow 10. At this point in time, the disk head is located at the beginning of sector 5. Data transfer is initiated immediately with the disk controller reading the data from sector 5 and continuing to read data until all sectors have been read. The disk controller initiates transfer to the host computer upon the completion of transfer from data sector 1. Again, due to the faster data transfer rate of the host computer, a lag time L1 is present between completion of the transfer of sector 1 data and the initiation of the transfer of sector 2 data to the host computer from the disk controller. A lag time L2 is also present after transfer of sector number 2, and a lag time L3 is present after transfer of sector number 3. After transfer of sector number 4, however, sectors 5, 6, 7 and 8 have already been transferred by the disk controller to the buffer memory. Consequently, transfer to the host computer can be accomplished at the host computer data transfer rate. Data transfer is therefore complete at the time represented by arrow 22. The total time from command to transfer completion TC1 is significantly reduced over the time for completion TC in FIG. 2. TC1 in a worst-case condition will be equal to TC2 where the read command is received from the host computer when the head location is over sector 1. Conversely, receipt of the data transfer command when the head is over sector 2 would result in the elimination of all lag times.

A zero latency read with transfer to the host computer non-sequentially provides even greater reduction in total transfer completion time as shown in FIG. 4. Upon receipt of the transfer command shown by arrow 10, the disk controller immediately begins data transfer. Sector number 5 is transferred from the data disk by the disk controller to the buffer memory. A host transfer is initiated immediately upon completion of the sector 5 transfer to the controller buffer memory to transfer sector 5 from the buffer memory to the host computer. Sectors 6 through 8 and 1–4 are transferred in sequence from the disk to the buffer memory by the disk controller and immediately upon completion of a sector transfer, transfer is initiated to the host computer. While lag time L exists between sector transfers to the host computer as in the sequential read case demonstrated in FIG. 2, the overall transfer completion time TC2 is significantly reduced.

Figure 3A:
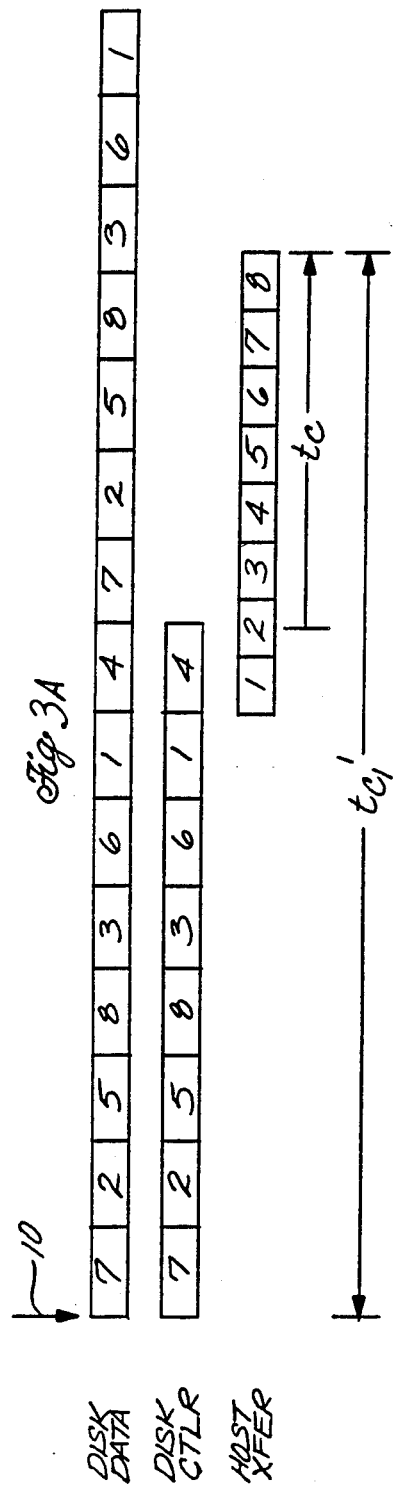
FIG. 3a is a representation of a data transfer between the disk controller and host computer using a zero latency read with sequential host transfer with a 3 to 1 interleave of sectors.

The advantages of zero latency read and sequential or non-sequential host transfer become readily apparent in disk drive applications where data interleave is present. Data interleave assuming an eight-sector track is shown in FIG. 5 for one-to-one, two-to-one, and three-to-one data interleave. In the one-to-one interleave, the sectors on the track are sequential. In a two-to-one interleave, the sector number is incremented every second sector. Similarly, in the three-to-one interleave, the sector number is incremented on the third sector. In a sequential read with a three-to-one interleave, the lag times between transfers from the disk controller to the host computer would be the sector lag time L plus two sector times, a total of three revolutions of the disk would be required for data transfer of an entire track. The zero latency read with sequential host transfer may still be accomplished in only one disk revolution plus transfer completion time TC3 as shown in FIG. 3A. A zero latency read with non-sequential host transfer (in interleave order) may be accomplished in one disk rotation plus one host computer sector transfer time.

The zero latency read method of the present invention is most beneficial for transfer of data from an entire track. Such data transfer, however, is common in many current data caching schemes for improved data transfer efficiency. Selection of a zero latency read may be made by the microprocessor based on head location upon reaching the address track, the number of sectors to be read if less than a full track, and the relative position of the initial sector requested by the host computer. The efficiency of the zero latency read for partial track transfers is increased when sector interleave is present. De-interleaving by the microprocessor during transfer from the buffer memory to the host computer, or de-interleaving by the host computer after data transfer significantly enhances data transfer time.

Figure 6:
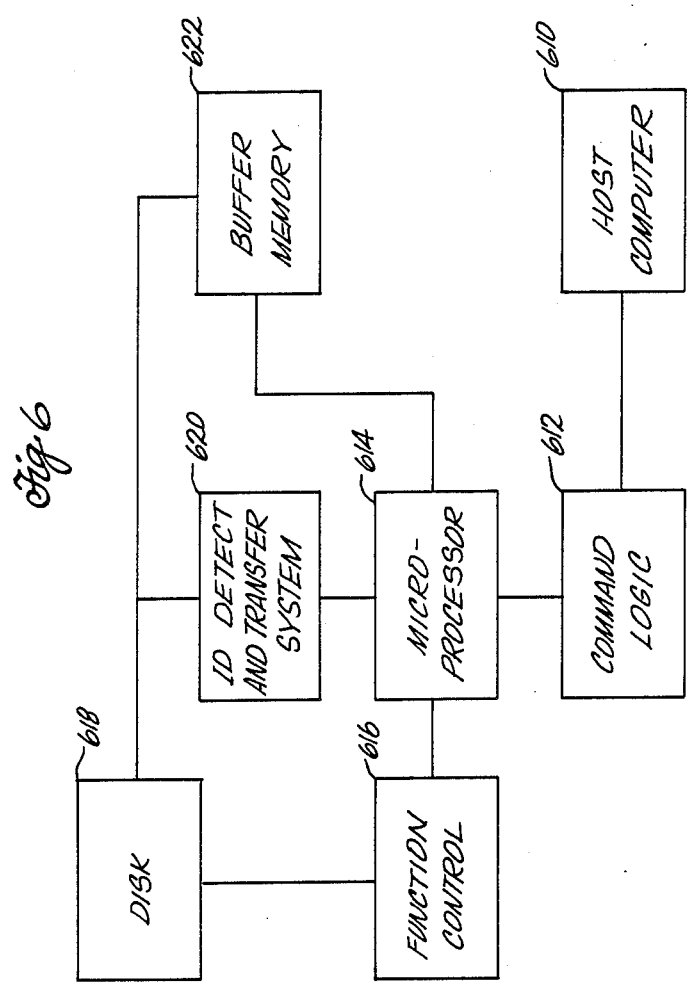
FIG. 6 is a block diagram of the circuit architecture to employ zero latency data transfer.

The architecture provided by the invention for zero latency read is shown in FIG. 6. The host computer 610 provides commands through the command logic 612 to the microprocessor 614. A "read data" command is processed through the microprocessor and head positioning is accomplished through the function controller 616 moving the heads on the disk 618 to the track containing the data requested by the host computer. The microprocessor will provide commands to the ID detect and transfer system 620 to determine location of the head and to initiate data transfer. The microprocessor command designations and function will be described in greater detail subsequently. ID information received from the transferred data is transmitted through the ID detect and transfer system to the microprocessor. Address control is provided by the microprocessor to the buffer memory 622 for storage of the data transferred. The microprocessor maintains a table of ID information and buffer memory address for the data transfer. Data in the buffer memory is then sequenced for transfer to the host computer as described in the previously referenced patent application to Bonke, et al., or using other methods known in the prior art.

Figure 7:
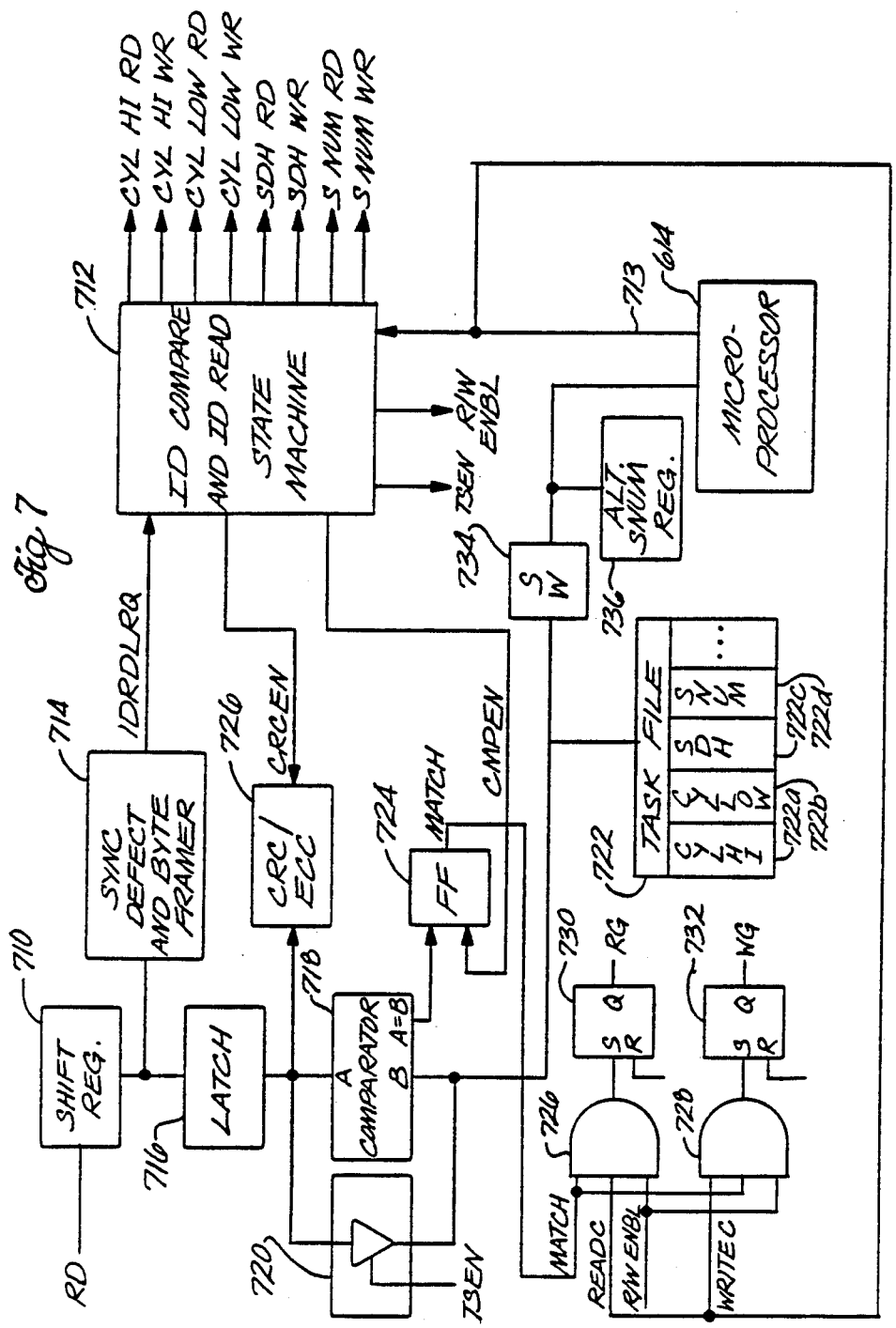
FIG. 7 is a schematic logic diagram of the ID detect and transfer system.

The ID detect and transfer system is shown in greater detail in FIG. 7. Data is received from the disk sequentially at the RD input by shift register 710. After positioning of the head at the proper track, as previously described, the microprocessor may issue one of the commands shown in Table 1 to the state machine 712 on command lines 713.

TABLE 1

| COMMAND | FUNCTION |
| --- | --- |
| SCAN ID | Scan data for ID field |
| Read/Write Normal | Compare ID bytes for track and sector numbers. Read or write dat on positive compare. |
| Read/Write Zero Latency | Compare ID bytes for track and write sector number to task file. Read or write data to present sector. Tables address buffer location to sector number. |

ID field information entering the shift register is identified by the SYNC detect and byte framer 714, which issues an ID read load request command IDRDLRQ to the state machine. In the embodiment shown, a latch 716 captures each byte of incoming data for comparison in comparator 718 or transfer through write drivers 720. A plurality of registers individually connected to the state machine by read and write command lines, to be described in greater detail subsequently, are collectively designated as the task file 722, and include a cylinder high register 722A, a cylinder low register 722B, a SDH register 722C, and a sector number register 722D.

Figure 8:
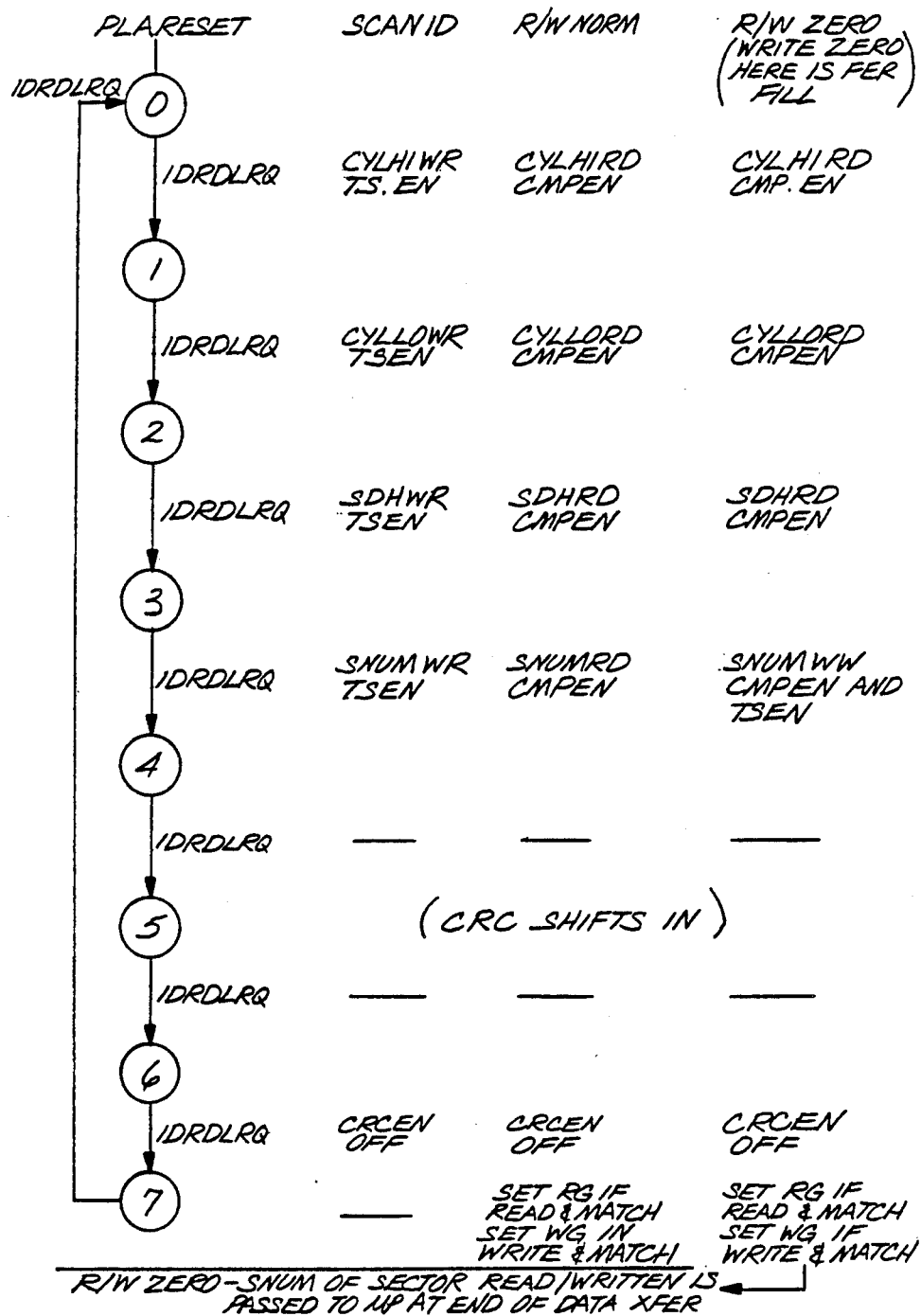
FIG. 8 is a state diagram for the PLA state machine.

A state diagram for the PLA state machine is shown in FIG. 8. The state machine steps through steps 0–7 upon assertion of the IDRDLRQ by the sync detector and bite framer. If the command issued by the microprocessor is a scan ID command, the control signals issued by the state machine in each state are shown in the corresponding column of FIG. 8.

Upon each assertion of IDRDLRQ, the state machine will assert the transfer enable signal TSEN and will sequentially assert cylinder high write CYLHIWR, cylinder low write CYLLOWR, SDH write SDHWR, and sector write SNUMWR to the task file registers. Data is transferred from the latch by the assertion of TSEN by the state machine enabling the write drivers for transfer of the byte present in the latch to the task file registers in sequence.

If the command issued by the microprocessor is a read/write normal command, R/WNORM, the state machine provides a read command sequentially to each register in the task file CYLHIRD, CYLLORD, SDHRD and SNUMRD simultaneously with a compare enable command CMPEN provided to a first flip-flop 724 having as an input the A=B or compare positive output from the comparator. If a positive comparison is received from the comparator, the flip-flop provides a high signal on the normal output MATCH. In each PLA sequence, states 4 and 5 provide cyclic redundancy check sum or error correction code verification of the data. A CRC enable command CRCEN is provided by the state machine to the CRC/ECC logic 726 for data verification. A match command from the flip-flop is provided to AND gates 726 and 728. If the command issued by the microprocessor is a read command, a read signal READC is provided to AND gate 726. Similarly, a write command results in a write signal WRITEC to AND gate 728. If states 1–6 of the state machine have provided a positive compare, the state machine will issue a read/write enable command R/WENBL which is input to both AND gates to assert the read gate RG through a first sample and hold 730 or write gate WG through a second sample and hold 732 during state 7. Assertion of read gate or write gate in this fashion will read or write data into the data field of the sector on the disk track. In this mode, the convention functions identically to prior art devices.

If the command issued by the microprocessor is a read/write with zero latency, R/WZERO, states 1, 2 and 3 provide comparison of the cylinder and head bytes similar to the R/WNORM sequence. The sector number byte, however, is written to the sector number register SNUM of the task file. This is accomplished by issuance of the SNUMWR, CMPEN and TSEN signals by the state machine. The sector number byte is transferred through the write drivers to the sector number register while simultaneously providing a compare at both ports A and B of the comparator. A positive compare is therefore automatically achieved. MATCH is consequently transmitted from the flip-flop to the AND gates for assertion of RG or WG. At the conclusion of the data transfer from the sector to the buffer memory, the sector number present in the SNUM register is transferred through switch 734 to the alternate sector number register ALTSNUM 736. The microprocessor reads the sector number of the data sector read or written for maintaining the buffer address table previously described.

In the present embodiment, use of the zero latency write command provides zero fill capability to assist in data track formatting. For cases with known sector numbering and interleave, the zero latency write capability may be utilized for data transfer from the buffer memory to the disk with an appropriate buffer address and second number table maintained by the microprocessor.

Having now described the invention in detail in accordance with the requirements of the patent statutes, those skilled in this art will have no difficulty in making changes and modifications in the individual circuit elements or their relative connections in order to meet specific requirements or conditions. Such changes and modifications may be made without departing from the scope and spirit of the invention as set forth in the following claims.

What is claimed is:

1. A method for conducting zero latency data transfer between a data disk and a host computer through a buffer memory comprising:

receiving the identification bytes for a data sector from the data disk;

comparing the track ID bytes to verify track position;

writing the sector number byte to a register;

transferring the data from the sector to the buffer memory;

maintaining a table look-up for sector number and buffer memory address; and transferring data to the host computer by reference to the address table.

2. A circuit architecture for a zero latency transfer of data from a track on a data disk having numerous sectors to a buffer memory under the control of a microprocessor comprising:

means for capturing identification bytes from the sectors, the capture means having a detection signal output;

a state machine, responsive to the detection signal output and commands from the microprocessor, having a plurality of paired read and write command outputs and a transfer enable output, a plurality of registers for track identification and sector number identification having one-to-one correspondence with and responsive to the read/write command pairs from the state machine;

a comparison means connected between the capture means and the plurality of registers for comparing data bytes present in the capture means with data bytes present in the registers enabled by the corresponding read command from the state machine;

transfer means connected across the comparison means and responsive to the transfer enable command from the state machine for transferring data bytes from the capture means to the registers as enabled by the corresponding write command from the state machine;

means for transferring data from the sector on the disk to the buffer memory; and means for transferring a data byte written to the sector number register by the transfer means to the microprocessor.

* * * * *